Patented Nov. 15, 1949

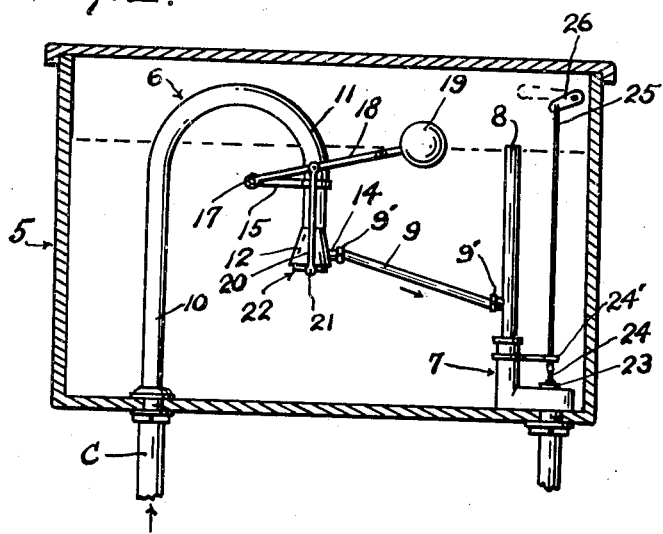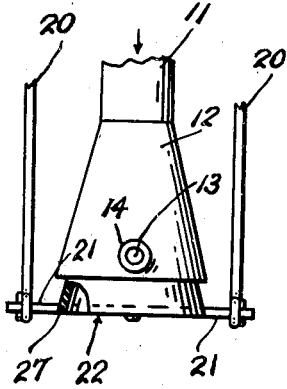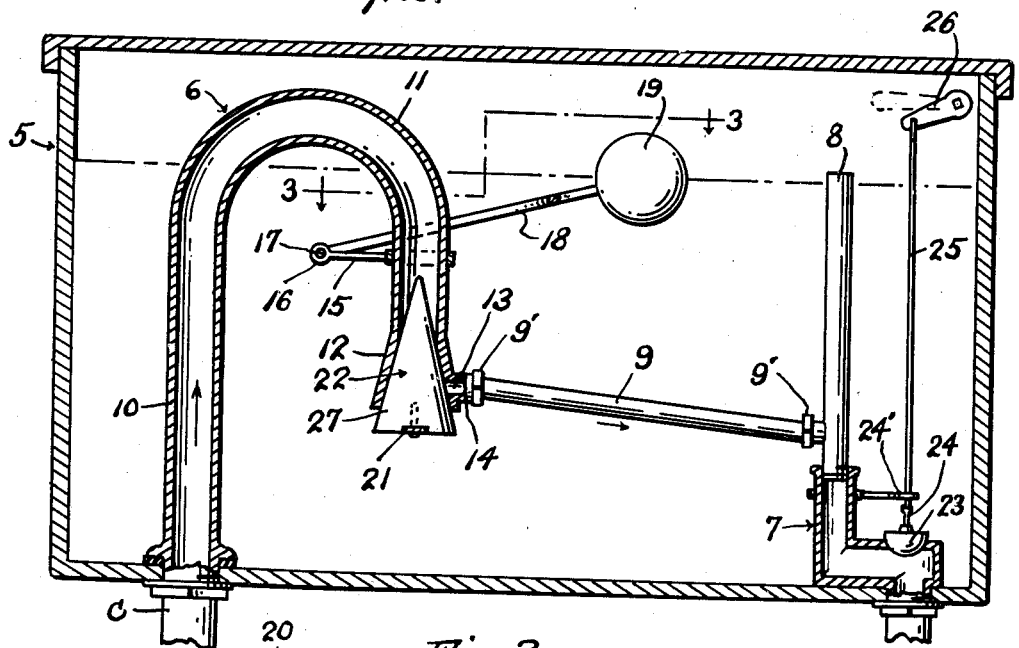

2,488,457

UNITED STATES PATENT OFFICE 2,488,457

TOILET FLUSH TANK VALVE

Rudolph Wallner, Sheboygan, Wis.

Application December 28, 1945, Serial No. 637,582

1 Claim. (Cl. 137—104)

This invention relates to toilet flush tanks and more particularly the valves thereof.

One of the objects of this invention resides in the provision of a toilet flush tank having inlet and outlet valves adapted to cooperate in eliminating noise during filling and discharging water therefrom.

Another object of this invention resides in the particular construction of the inlet valve.

A further object of this invention resides in the inlet valve controlling means.

A still further object of this invention resides in the provision of means for connecting the inlet and outlet valves and controlling flow of water from the former to the latter.

With these and other objects in view, this invention resides in certain novel features of construction and arrangement of elements to be hereinafter more particularly set forth in the specification, illustrated in the accompanying drawing and pointed out in the appended claim and, while this disclosure depicts my present conception of the invention, the right is reserved to resort to such changes in construction and arrangement of elements as come within the spirit of the invention.

In the accompanying drawing forming a part of this application:

Fig. 1 is a longitudinal vertical sectional view through the flush tank showing the valves thereof in full lines.

Fig. 2 is a similar view on an enlarged scale showing certain portions in section.

Fig. 3 is an enlarged sectional view taken approximately on line 3—3 of Fig. 1.

Fig. 4 is an enlarged side view of a portion of the inlet valve.

In the present embodiment of this invention, the numeral 5 designates a toilet flush tank of conventional configuration provided with water inlet and outlet valves 6 and 7, the latter of which is provided with an overflow pipe 8 connected to the former valve by a pipe 9 having couplings 9' at its opposite ends.

The inlet valve 6 is of substantially inverted U-shape configuration including a tubular supporting arm 10 connected to a water supply pipe C in the usual manner and a depending arm 11 having its lower or free end 12 flared outwardly and provided with an outlet port 13 formed in a nipple 14 to which the pipe 9 is connected at one end by one of the couplings 9' for communication thereof with the inlet valve 6.

Secured to the arm 11 above the flared end thereof and lying on a substantially horizontal plane is a V-shape bracket 15 having bearings 16 at its outer ends to receive a rod 17 on the opposite ends of which is journalled a fork shape rocker-arm 18 surrounding the arm 11 and carrying a float 19 at its looped end.

Attached to the aforesaid rocker-arm 18 through the instrumentality of links 20 connected at their lower ends to a cross-bar 21, is a substantially cone-shaped plug 22 which is secured to the aforesaid cross-bar by a screw, bolt or the like.

The valve 7 includes a plug 23 having a stem 24 adapted to slide through a bracket 24' secured thereto and is operated in the usual manner by a rod 25 connected to a handle 26 adjacent the upper end of the tank.

The plug 22 is preferably covered with rubber 27 or the like, however, the rubber coating may be omitted and the plug constructed of any suitable material capable of performing functions similar to its present adoption.

With the aforesaid assemblage of elements disposed in a toilet flush tank, the bowl of the toilet (not shown) is flushed by unseating the plug 23 in the usual manner whereupon the float 19 will descend and thereby cause the plug 22 to open the port 13 and lower end of the depending arm 11 thus permitting water to pass into the tank and through the pipe 9 to the outlet valve with the result that noise caused by rushing water leaving the tank will be eliminated.

With this invention fully set forth, it is manifest that means are provided whereby noise from toilet flush tanks is eliminated and, through the cooperation of elements set forth, positive supply and discharge of water to and from the tanks is assured.

Having thus described my invention, what I claim and desire to protect by Letters Patent is:

A toilet flush-tank comprising, a substantially inverted U-shape tube having one end threaded and its opposite end flared and provided with an aperture therein, a nipple formed on the flared end of the tube with its bore registering with the aforesaid aperture, a cone shape plug seated in the flared end of the U-shape tube and having a groove formed in its lower surface, a cross bar having round ends seated in the aforesaid groove, a rubber cover disposed over the outer surface of the plug and having notches in its lower edge receiving opposite outer portions of the cross bar, means securing the bar to the plug, a bracket having diverging arms secured to the tube above the flared end thereof, a U-shape rocker arm pivoted at its outer ends to the bracket, a float secured to the loop portion of the bracket, and links connecting the bracket to opposite ends of the cross bar.

RUDOLPH WALLNER.

REFERENCES CITED

The following references are of record in the file of this patent:

UNITED STATES PATENTS

| Number | Name | Date |
|---|---|---|
| 1,072,971 | Meyer | Sept. 9, 1913 |
| 1,323,960 | Burril | Dec. 2, 1919 |
| 1,408,192 | Gunn | Feb. 28, 1922 |
| 2,164,927 | Kohler | July 4, 1939 |